(12) United States Patent
Baroody

(10) Patent No.: US 10,308,154 B2
(45) Date of Patent: Jun. 4, 2019

(54) INTEGRATED BLANKET FOR VEHICLE SEAT

(71) Applicant: Connor Nicholson Baroody, Dallas, TX (US)

(72) Inventor: Connor Nicholson Baroody, Dallas, TX (US)

( * ) Notice: Subject to any disclaimer, the term of this patent is extended or adjusted under 35 U.S.C. 154(b) by 177 days.

(21) Appl. No.: 15/627,431

(22) Filed: Jun. 19, 2017

(65) Prior Publication Data

US 2018/0361899 A1   Dec. 20, 2018

(51) Int. Cl.
*B60N 3/00* (2006.01)
*B60R 22/14* (2006.01)

(52) U.S. Cl.
CPC .............. *B60N 3/00* (2013.01); *B60R 22/14* (2013.01)

(58) Field of Classification Search
None
See application file for complete search history.

(56) References Cited

U.S. PATENT DOCUMENTS

| | | | |
|---|---|---|---|
| 720,260 A * | 2/1903 | Kutscher | |
| 1,383,730 A * | 7/1921 | Lavoie | B60N 2/6027 160/24 |
| 1,477,031 A * | 12/1923 | Canning | B60N 2/60 160/121.1 |
| 4,699,401 A * | 10/1987 | Saenz | B60R 22/00 224/602 |
| 4,923,211 A * | 5/1990 | Klose | B60N 2/6009 280/727 |
| 6,409,271 B1 * | 6/2002 | Caramanis | B60R 22/00 280/801.1 |
| 6,746,069 B1 * | 6/2004 | McKenzie | B60J 1/2038 2/48 |
| 7,451,494 B2 * | 11/2008 | Monroe | A41B 13/10 2/49.1 |

* cited by examiner

*Primary Examiner* — Sarah B McPartlin

(57) ABSTRACT

An integrated comfort item for a vehicle seat. Such comfort items include but are not limited to a blanket, pajamas or onesie stored on a roller that is mounted within an enclosure of the vehicle seat arm. The comfort item such as a blanket may be unrolled by the user when sitting in the vehicle seat. Upon conclusion of the journey, the user may then actuate the spring in the roller and roll the comfort item back onto the roller to store in the vehicle seat arm enclosure for future use.

1 Claim, 2 Drawing Sheets

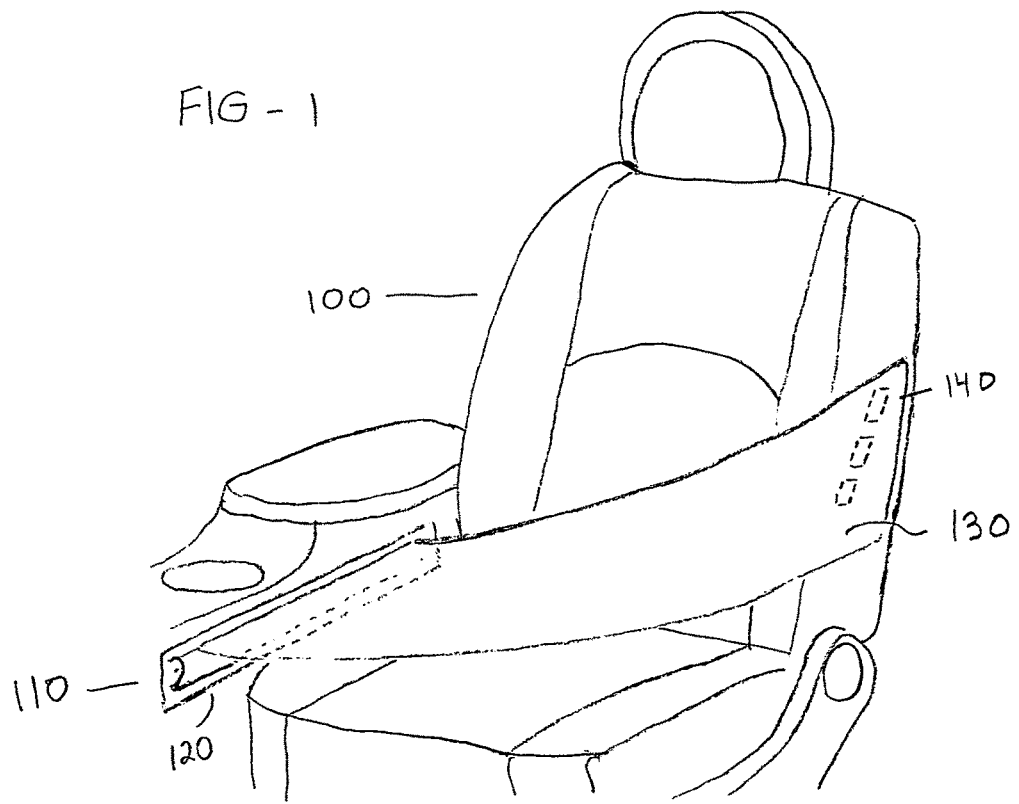

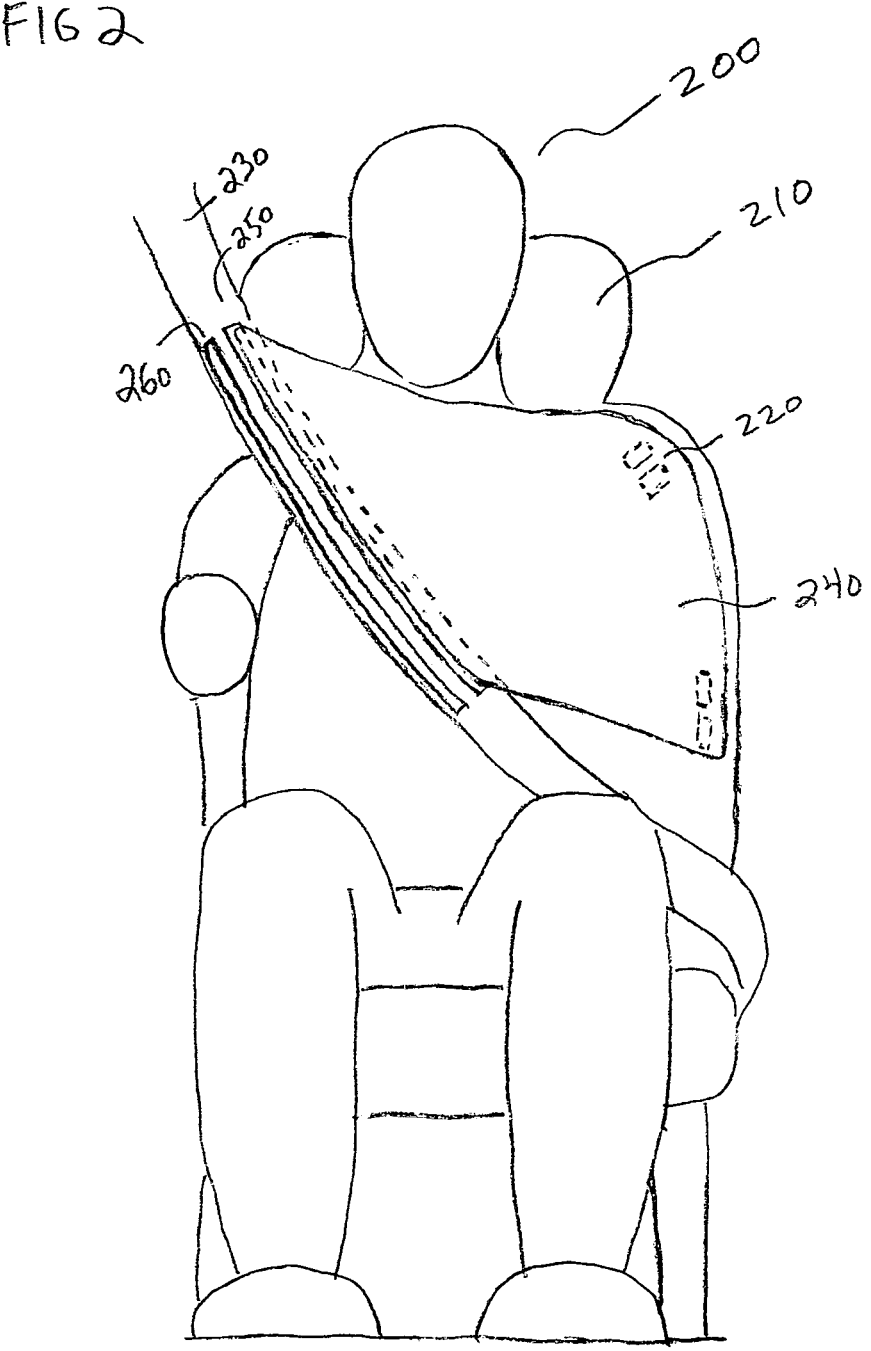

INTEGRATED BLANKET FOR VEHICLE SEAT

BACKGROUND OF THE INVENTION

Technical Field

The present invention relates to an improved blanket for use by passengers on extended car, bus, train, or airplane trips who wish to enjoy the comfort of a blanket or similar bed covering without the inconvenience of bringing the blanket or other bed covering for the journey.

Description of Related Art

Many types of devices intended to make travel more comfortable are known. These include "airplane" pillows, as well as blankets that can be requested on airplanes. Travelers frequently bringing their own pillows and blankets with them for the trip, but these must be carried through the airport, and now through TSA screening. These articles take up space in carry on-luggage that is highly prized to avoid having to pay airline baggage fees.

In the context of a family traveling with younger children, the children can lose the blanket in the airport, or in the context of a summer vacation car trip, the children can take each other's blankets. The children traveling in a vehicle can also forget to bring the blanket. A blanket or other bed covering that is not affixed to the seat may also fall off or shift during sleep when the user changes position in the seat.

There is thus a need for an improved vehicle seat with an integrated blanket or other bed covering that may be conveniently deployed to add to the comfort of the user.

SUMMARY OF THE INVENTION

The invention is a blanket or other bed covering integrated with a vehicle seat such as in a car, taxi, bus or aircraft. In a preferred embodiment, a blanket is provided on a spring-loaded roller that is integrated into the side arm of a vehicle seat. The invention is not limited to bed coverings such as blankets and may include pajama type clothes such as a "onesie" for adults or children. Such blankets or other bed coverings or a onesie or pajamas are collectively referred to herein as "comfort items." The user, which may include a passenger or driver, may deploy the blanket by pulling a tab attached to the blanket and an actuating the roller to pull out the blanket to the desired length. The leading edge of the blanket may have a hook and loop type fastener, such as Velcro® patch, attached to affix to the opposite seat arm or opposite edge of the seat cushion to hold the blanket in place.

Other aspects, embodiments and features of the invention will become apparent from the following detailed description of the invention when considered in conjunction with the accompanying drawings. The accompanying figures are schematic and are not intended to be drawn to scale. In the figures, each identical or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a close up view of a preferred embodiment of the present invention including a blanket integrated with the seat arm.

FIG. 2 is a close up view of another embodiment of the present invention including a blanket integrated with the seat belt that is attached to a vehicle seat.

DETAILED DESCRIPTION

FIG. 1 depicts a vehicle seat 100 with an integrated blanket 130. The blanket is stored in an enclosure 110 in the seat arm. The blanket is mounted on a spring-loaded roller 120. The blanket can be removed by the user pulling the tab 150. The user may secure the blanket over the user by securing the a hook and loop type fastener, such as Velcro® patched, patches 140 located at the leading edge of the blanket which may be attached to the corresponding patch on the side of the opposite seat cushion. When the user wishes to store the blanket, the user can tug on the blanket to actuate the spring in the roller, similar to a window blind.

In an alternate embodiment, the blanket 130 can be replaced with an adult or child "onesie" with extra large openings for legs and arms for maximum ease of entry and exit. The onesie is attached to the roller with additional fabric placed along the edge of the onesie nearest the roller along the axis from head to toe.

FIG. 2 depicts an alternative embodiment where the blanket is split into two parts and stored in two pockets 250 and 260 mounted along the top side (facing away from the user) of the seat belt. FIG. 200 shows the user 200 sitting in seat 210 and wearing seatbelt 230. The top portion of the blanket 240 is stored in the top pocket 250 attached along with length of the seatbelt. The top blanket is attached with conventional means, such as sewing, to the seatbelt pocket and folded into the pocket.

In a further embodiment, the roller 120 may be located in a vehicle door, instead of in the seat arm. When located in a vehicle door, the roller would be installed such that the roller opens into the interior of the vehicle. Although various locations within a car door are possible, the roller could be located in place of a map pocket.

What is claimed is:
1. An integrated comfort item for a vehicle seat, comprising:
   a) a seat belt attached to said vehicle seat located in a vehicle, said seat further comprising a first side and a second side opposite each other;
   b) upper and lower pockets attached to the seat belt along the length of the seat belt wherein a upper pocket is located closer to the first side of the vehicle seat relative to the lower pocket, and the lower pocket is located closer to the second side of the vehicle seat relative to the upper pocket;
   c) a comfort item attached to the seat belt and removably stored inside each pocket; and
   d) means for securing the comfort item stored in the upper pocket to the first side of the vehicle seat over a user's body.

* * * * *